United States Patent [19]
Squiller et al.

[11] Patent Number: 6,103,849
[45] Date of Patent: Aug. 15, 2000

[54] STORAGE STABLE, HEAT CURABLE POLYURETHANE COMPOSITIONS

[75] Inventors: Edward P. Squiller, Pittsburgh, Pa.; James W. Rosthauser, Glen Dale, W. Va.; Peter H. Markusch, McMurray; Terry A. Potter, Beaver, both of Pa.

[73] Assignee: Bayer Corporation, Pittsburgh, Pa.

[21] Appl. No.: 08/266,290

[22] Filed: Jun. 27, 1994

[51] Int. Cl.$^7$ ................................................... C08G 18/80
[52] U.S. Cl. .................................................. 528/45; 528/59
[58] Field of Search .................................. 525/452, 453, 525/456; 528/45, 59, 85

[56] References Cited

U.S. PATENT DOCUMENTS

| | | | |
|---|---|---|---|
| 3,743,626 | 7/1973 | Emmons | 260/77.5 AQ |
| 3,865,791 | 2/1975 | Brinkmann et al. | 260/77.5 CH |
| 3,886,228 | 5/1975 | Bolger | 260/858 |
| 4,118,376 | 10/1978 | Pedain et al. | 528/59 |
| 4,469,857 | 9/1984 | John | 528/59 |
| 4,595,445 | 6/1986 | Hombach et al. | 156/307.3 |
| 4,619,985 | 10/1986 | Hess et al. | 528/49 |
| 4,624,996 | 11/1986 | Rizk et al. | 525/453 |
| 5,124,447 | 6/1992 | Squiller et al. | 528/45 |
| 5,130,402 | 7/1992 | Akiyoma et al. | 528/45 |
| 5,138,011 | 8/1992 | Markusch et al. | 528/45 |
| 5,142,014 | 8/1992 | Markusch et al. | 528/45 |
| 5,264,515 | 11/1993 | Cody et al. | 528/10 |

FOREIGN PATENT DOCUMENTS 0 156 165   10/1985   European Pat. Off. .

*Primary Examiner*—Paul Thibodeau
*Assistant Examiner*—D. Lawrence Tarazano
*Attorney, Agent, or Firm*—Joseph C. Gil; Lyndanne M. Whalen

[57] ABSTRACT

Storage-stable, one-component polyurethane compositions which cure at elevated temperature are made up of (a) an isocyanate which has been blocked with a phenol or an oxime, (b) at least one compound selected from polyketimines, polyenamines and oxazolidines, and (c) a compound which generates water at elevated temperature. Components (a), (b) and (c) are used in amounts such that the equivalent ratio of a:b:c is from about 1.0:0.1:0.5 to about 1:2:2.

16 Claims, No Drawings

STORAGE STABLE, HEAT CURABLE POLYURETHANE COMPOSITIONS

BACKGROUND OF THE INVENTION

The present invention relates to storage-stable, one-component polyurethane compositions which cure at elevated temperature and to the use of these compositions in coatings and sealants.

Polyurethane compositions which cure to form coatings and sealants are well known. The known compositions include both one-component and two-component systems. From a practical standpoint, one-component systems are preferred because they are much easier to handle and to use. They do, however, require storage in the absence of moisture if they will not be used shortly after they are produced.

U.S. Pat. No. 3,865,791 discloses one-component systems composed of a polyisocyanate and at least one compound selected from polyenamines, enamines having aldimine or ketimine groups, enamines having a hydroxy group, and prepolymers formed by reacting a polyisocyanate with a hydroxy-enamine. Prepolymers formed by reacting the disclosed enamines with a polyisocyanate may be combined with a second isocyanate which second isocyanate may be capped. This composition is cured by the addition of water or by exposure to atmospheric moisture.

U.S. Pat. No. 3,886,228 discloses single package curable polyurethane compositions containing a polyisocyanate which may be blocked and a curing agent. The curing agent is a condensation product obtained by reacting approximately equimolecular proportions of diethylene triamine or triethylene tetramine with an anhydride selected from phthalic anhydride, hexahydrophthalic anhydride, maleic anhydride and succinic anhydride. These disclosed compositions are sensitive to water, alcohols and other compounds containing active hydrogen atoms. Partial blocking of the isocyanate groups of aromatic isocyanates with phenols, alkyl phenols, polyphenols or phenolic novolacs are taught to reduce sensitivity of the disclosed compositions to active hydrogen atoms without significantly decreasing the shelf-life or curing rate at elevated temperature. The compositions described in this disclosure cure over an extended period of time (even at elevated temperatures) and have a Durometer hardness of less than about 50 Shore D.

U.S. Pat. No. 3,743,626 discloses hydrocurable oxazolidine-isocyanate compositions which cure in the presence of moisture without substantial heating.

U.S. Pat. No. 4,118,376 also discloses hydrocurable compositions made up of an oxazolidine compound and a prepolymer containing free isocyanate groups. These prepolymers are formed by reaction of a polyisocyanate with dispersions which have been synthesized in situ in a dispersing media of polyhydroxyl compound. The polyhydroxyl compound is substantially more reactive with isocyanates than the dispersing media. The preferred dispersions are dispersions of isocyanate-hydrazine or hydrazine hydrate in a polyhydroxy polyether.

U.S. Pat. No. 4,595,445 discloses adhesive compositions which set at elevated temperatures. These compositions are made up of a finely-divided polyisocyanate of retarded activity of which 0.1–25% of the isocyanate groups are surface modified, a polyamine and optionally, a polyol.

U.S. Pat. No. 4,619,985 discloses deactivated suspensions of finely divided polyisocyanates in deactivated, relatively high molecular weight polyols and/or polyamines. The polyols and/or amines are deactivated by addition of substances which have an acylating, neutralizing, alkylating or adsorbing effect.

U.S. Pat. No. 4,624,996 discloses a heat curable one-package polyurethane resin composition which is made of an isocyanate-terminated prepolymer having isocyanate groups blocked by an oxime and a curing agent having at least two active hydrogen atoms per molecule. Polyamines blocked by reaction with an anhydride are among the curing agents disclosed.

U.S. Pat. No. 5,124,447 discloses one-component polyurethane or polyurea compositions which cure at ambient temperature. These compositions are made up of a) a liquid polyisocyanate having isocyanate groups blocked with a phenolic blocking agent and b) a solid polyamine salt which is insoluble in and dispersed throughout the liquid blocked polyisocyanate. The polyamine salt is the reaction product of a polyamine with an organic or inorganic acid.

U.S. Pat. No. 5,142,014 discloses a one-component polyurethane or polyurea composition which cures at ambient temperature which is made up of a) a liquid polyisocyanate in which the isocyanate groups are blocked with a phenolic blocking agent and b) a solid polyamine internal salt which is insoluble in and dispersed throughout the blocked liquid polyisocyanate a). The solid internal polyamine salt contains at least two primary or secondary amino groups and at least one organic acid group. Among the solid polyamine internal salts described as preferred is the reaction product of phthalic acid anhydride and diethylene triamine.

U.S. Pat. No. 5,138,011 discloses one-component polyurethane or polyurea compositions which are made up of a) a liquid polyisocyanate in which the isocyanate groups are blocked with a phenolic blocking agent and b) a solid polyamine which is insoluble in and dispersed throughout the liquid blocked polyisocyanate a). The solid polyamine must remain stable in the presence of the polyisocyanate component for at least one week when stored at ambient temperature. Among the polyamines described as being useful in these compositions are the trans/trans isomer of 4,4'-diaminodicyclohexyl methane, 4,4'-diamino diphenyl methane and 2,4-diamino-toluene.

U.S. Pat. No. 5,264,515 discloses moisture curable compositions in which a moisture curable base and a curing agent which does not contain molecular water but which produces water upon activation to cure the curable base. The shelf life of the curable composition may be extended by coating either the particulate curing agent or one or more of the components of the composition with a material that is meltable or frangible.

Many of the known one-component systems have the disadvantage of requiring the addition of a curing agent, such as water, or exposure of a substrate to which the composition has been applied to a curing agent such as atmospheric moisture. The addition of a curing agent to the composition shortly before it is applied to a substrate, requires thorough mixing of the curing agent to get even cure and limits the amount of time in which the curing composition must be applied to a substrate. Exposure of the composition to a curing agent after it has been applied does not have these disadvantages. However, the exposure curing method is disadvantageous because the cure obtained when the composition is applied at higher thicknesses is uneven. The outermost portion cures more quickly than that portion which is not directly exposed to the curing agent.

U.S. Pat. No. 4,469,857 discloses a two-component system for the production of a synthetic resin compound capable of curing in the absence of moisture which system is made up of a first component which includes a polyisocyanate and an enamine and a second component which includes a carrier compound having water aggregated thereto.

A one-component polyurethane or polyurea composition which cures evenly without the need to add a curing agent or to expose a coated substrate to a curing agent would be advantageous.

SUMMARY OF THE INVENTION

It is an object of the present invention to provide a storage-stable, one-component polyurethane composition.

It is another object of the present invention to provide a storage-stable, one-component polyurethane coating or sealant composition which can be cured at elevated temperature even in the absence of atmospheric moisture.

It is a further object of the present invention to provide a process for coating a substrate with a polyurethane coating.

It is also an object of the present invention to provide a one-component polyurethane composition which is storage stable at ambient temperature for at least 3 months, generally greater than 6 months.

It is another object of the present invention to provide a one-component polyurethane composition which is storage stable at ambient temperature but which cures quickly at elevated temperatures.

These and other objects which will be apparent to those skilled in the art are accomplished by a composition made up of a) an isocyanate which has been blocked with a phenol or an oxime; b) at least one compound selected from the group consisting of polyketimines, polyenamines and oxazolidines; and c) a compound which generates water at elevated temperature.

DETAILED DESCRIPTION OF THE PREFERRED EMBODIMENTS OF THE INVENTION

The present invention relates to storage-stable, one-component compositions made up of a) an isocyanate which has been blocked with phenol or oxime; b) at least one compound selected from the group consisting of polyketimines, polyenamines and oxazolidines; and c) a compound which generates water at elevated temperatures, i.e., temperatures above 100° C.

The polyisocyanates which may be blocked with a phenol or oxime in accordance with the present invention include any of the known isocyanates. Preferred polyisocyanates are isocyanate prepolymers and adducts which have been blocked with a phenol.

The isocyanate groups may have aromatically, aliphatically-cycloaliphatically- or araliphatically-bound isocyanate groups. The polyisocyanates prior to the blocking reaction have an isocyanate content of about 1 to 30, preferably about 2 to 25 weight percent, based on the polyisocyanate, and contain an average of about 2 to 6, preferably about 2 to 4 isocyanate groups per molecule.

The polyisocyanates useful for preparing the polyisocyanate component of the present invention include monomeric polyisocyanates, polyisocyanate adducts or isocyanate-terminated prepolymers.

Suitable polyisocyanate adducts may be produced from monomeric polyisocyanates (preferably monomeric diisocyanates) and contain biuret, allophanate, urea, urethane, carbodiimide or uretdione groups or isocyanurate rings.

Polyisocyanates which may be used as the monomeric polyisocyanate or for preparing a polyisocyanate adduct include organic diisocyanates represented by the general formula $$R(NCO)_2$$

in which

R represents an organic group obtainable by removal of the isocyanate groups from an organic diisocyanate having a molecular weight of from about 112 to 1,000, and preferably from about 140 to 400. Preferred diisocyanates are those represented by the general formula indicated above in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms, or a divalent aromatic hydrocarbon group having 6–15 carbon atoms.

Examples of organic diisocyanates which are particularly suitable for the process of the present invention include: 1,4-tetramethylene diisocyanate; 1,6-hexamethylene diisocyanate; 2,2,4-trimethyl-1,6-hexamethylene diisocyanate; 1,12-dodecamethylene diisocyanate; cyclohexane-1,3-, and -1,4-diisocyanate; 1-isocyanato-2-isocyanato-methyl cyclopentane; 1-isocyanato-3-isocyanatomethyl-3,5,5-trimethylcyclohexane (isophorone diisocyanate or IPDI); bis-(4-isocyanatocyclohexyl)methane; 1,3- and 1,4-bis-(isocyanatomethyl)-cyclohexane; bis-(4-isocyanato-3-methyl-cyclohexyl)-methane; α,α,α',α'-tetramethyl-1,3- and/or 1,4-xylylene diisocyanate; 1-isocyanato-1-methyl-4 (3)-isocyanatomethyl cyclohexane; 2,4- and/or 2,6-hexahydrotoluene diisocyanate; 1,3- and/or 1,4-phenylene diisocyanate; 2,4- and/or 2,6-toluene diisocyanate; 2,4- and/or 4,4-diphenylmethane diisocyanate and 1,5-diisocyanato naphthalene. Also suitable are polyisocyanates such as 4,4', 4"-triphenylmethane triisocyanate and polyphenyl polymethylene polyisocyanates obtained by phosgenating aniline/formaldehyde condensates. Mixtures of diisocyanates and/or polyisocyanates may, of course, also be used. Preferred diisocyanates are 1,6-hexamethylene diisocyanate; isophorone diisocyanate; bis-(4-isocyanatocyclohexyl)-methane; 2,4- and/or 2,6-toluene diisocyanate; and 2,4'- and/or 4,4'-diphenyl methane diisocynate.

Polyisocyanate adducts containing biuret groups may be prepared from the previously mentioned diisocyanates by processes such as those disclosed in U.S. Pat. Nos. 3,124, 605; 3,358,010; 3,644,490; 3,862,973; 3,903,126; 3,903, 127; 4,051,165; 4,147,714 or 4,220,749 by using co-reactants such as water, tertiary alcohols, primary and secondary monoamines, and primary and/or secondary diamines. The preferred diisocyanate to be used in these processes is 1,6-diisocyanato-hexane.

Polyisocyanate adducts containing allophanate groups may be prepared by from diisocyanates by any of the processes disclosed in U.S. Pat. Nos. 3,769,318 and 4,160, 080; British Patent 994,890; and German Offenlegungsschrift 2,040,645.

Polyisocyanate adducts containing isocyanurate groups may be prepared by trimerizing diisocyanates in accordance with the processes disclosed in U.S. Pat. Nos. 3,487,080; 3,919,218; 4,040,992; 4,288,586; and 4,324,879; German Auslegeschrift 1,150,080; German Offenlegungsschrift 2,325,826; and British Patent 1,465,812. The preferred diisocyanates to be used for producing such adducts are 2,4 diisocyanatotoluylene, 2,6-diisocyanatotoluene and mixtures of these isomers; 1,6-diisocyanatohexane; isophorone diisocyanate and mixtures of 1,6-diisocyanatohexane and isophorone diisocyanate.

Polyisocyanate adducts containing urea or urethane groups which are the reaction products of a diisocyanate and a compound having a molecular weight of less than 400 and containing 2 or more isocyanate-reactive hydrogens may be prepared by the process disclosed in U.S. Pat. No. 3,183,112. When preparing polyisocyanate adducts using a large excess of diisocyanate, the average isocyanate functionality may be determined from the functionality of the compounds containing socyanate-reactive hydrogens. For example, theoretically when an excess of a diisocyanate is reacted with a diol, a polyisocyanate with a functionality of approximately 2 will be produced, while a triol co-reactant will result in a polyisocyanate functionality of at least 3. By using mixtures of compounds containing isocyanate-reactive hydrogens, various functionalities can be obtained.

The preferred isocyanate-reactive hydrogen-containing compounds are disclosed in U.S. Pat. No. 3,183,112. Examples of appropriate isocyanate-reactive compounds include: ethylene glycol; 1,2- and 1,3-propylene glycol; 1,3- and 1,4-butanediol; 1,6-hexanediol; 1,8-octane-diol; neopentyl glycol; diethylene glycol; 2-methyl-1,3-propylene glycol; 2,2,-dimethyl-1,3-propylene glycol; the various isomeric bis-hydroxymethyl cyclohexanes; 2,2,4-tri-methyl-1,3-pentanediol; glycerine; trimethylol propane; ethylene diamine; diethylene triamine; triethylene tetraamine; 1,6-hexanediamine; piperazine; 2,5-dimethyl piperazine; 1-amino-3-aminomethyl-3,5,5-trimethylcyclohexane; bis(4-aminocyclohexyl)methane; bis(4-amino-3-methylcyclohexyl)methane; 1,4-cyclohexanediamine; 1,2-propanediamine; hydrazine; aminoacid hydrazides; hydrazides of semicarbazido carboxylic acids; bis-hydrazides and bis-semicarbzides; 1,3- and 1,4-butanediol; 2,2,4-trimethyl-1,3-pentanediol; trimethylol propane; and mixtures thereof. It is also possible to use any of the above-described polyisocyanate adducts for the further preparation of polyisocyanate adducts containing urethane or urea groups. Preferred diisocyanates for the preparation of polyisocyanate adducts containing urethane or urea groups are 2,4-diisocyanatotoluene, 2,6-diisocyanato-toluene, 1,6-diisocyanatohexane, isophorone diisocyanate and mixtures of these diisocyanates.

In addition to monomeric polyisocyanates or polyisocyanate adducts, the polyisocyanate component of the present invention may be prepared from isocyanate-terminated prepolymers. These prepolymers are formed by reacting an excess of polyisocyanate (preferably monomeric diisocyanate) with a high molecular weight isocyanate-reactive compound and optionally a low molecular weight isocyanate-reactive compound. Prepolymers prepared exclusively from polyisocyanates and low molecular weight isocyanate-reactive compounds are referred to as polyisocyanate adducts containing urea and/or urethane groups and have previously been discussed. A sufficient excess of the polyisocyanate should be used to ensure that the prepolymers are terminated with isocyanate groups. The high molecular weight compounds to be used with the previously described polyisocyanates for preparing the isocyanate-terminated prepolymers are selected from the known compounds containing isocyanate-reactive groups, preferably hydroxyl groups, which are at least difunctional in the sense of the isocyanate-addition reaction. These compounds generally have an average functionality of from about 2 to about 8, preferably from about 2 to about 4. The compounds containing at least two isocyanate-reactive hydrogen atoms generally have a molecular weight as determined by end group analysis) of from about 400 to about 10,000, preferably from about 400 to about 8,000.

Examples of the high molecular weight isocyanate-reactive compounds are polyester polyols, polyether polyols and amines, polyhydroxy polycarbonates, polyhydroxy polyacetals, polyhydroxy polyacrylates, polyhydroxy polyester amides and polyhydroxy polythioethers. The preferred high molecular weight isocyanate-reactive compounds are the polyhydroxyl polyethers, polyesters, polylactones, polycarbonates, polyester carbonates and especially polyacrylates.

Suitable polyester polyols include the reaction products of polyhydric alcohols (preferably dihydric alcohols to which trihydric alcohols may be added) and polybasic (preferably dibasic) carboxylic acids. In addition to polycarboxylic acids, carboxylic acid anhydrides and polycarboxylic acid esters of lower alcohols or mixtures thereof may be used to produce the polyesters. The polycarboxylic acids, anhydrides and esters may be aliphatic, cycloaliphatic, aromatic, and/or heterocyclic. These polycarboxylic acids, anhydrides or esters may be substituted, e.g., by halogen atoms, and/or unsaturated. Examples of suitable carboxylic acids, anhydrides and esters include: succinic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride, fumaric acid, dimeric and trimeric fatty acids such as oleic acid, which may be mixed with monomeric fatty acids; dimethyl terephthalates and bis-glycol terephthalate. Suitable polyhydric alcohols include: ethylene glycol; propylene glycol-(1,2)- and -(1,3); butylene glycol-(1,4) and -(1,3); hexanediol-(1,6); octanediol-(1,8); neopentylglycol; cyclohexane dimethano-(1,4)-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol; polybutylene glycol; glycerine and trimethylolpropane. The polyesters may also contain a portion of carboxyl end groups. Polyesters of lactones (e.g., $\epsilon$-caprolactone) or hydroxycarboxylic acids (e.g., $\delta$-hydroxycaproic acid), may also be used.

Polycarbonates containing hydroxy groups are known. Such products may be obtained by reacting diols (e.g., propanediol (1,3), butanediol-(1,4) and/or hexanediol-(1,6), diethylene glycol, triethylene glycol or tetraethylene glycol) with phosgene, diarylcarbonates such as diphenylcarbonate or with cyclic carbonates such as ethylene or propylene carbonate. Polyester carbonates obtained by reacting the polyesters or polylactones described above with phosgene, diaryl carbonates or cyclic carbonates.

Suitable polyether polyols may be obtained in known manner by reacting starting compounds which contain reactive hydrogen atoms with alkylene oxides such as ethylene oxide; propylene oxide; butylene oxide; styrene oxide; tetrahydrofuran or epichlorohydrin or with mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols described above as being useful for preparing the polyester polyols and, in addition, water; methanol; ethanol; 1,2,6-hexane triol; 1,2,4-butane triol; trimethylol ethane; pentaerythritol; mannitol; sorbitol;

methyl glycoside; sucrose; phenol; isononyl phenol; resorcinol; hydroquinone; 1,1,1- or 1,1,2-tris-(hydroxylphenyl)-ethane.

Polyethers which have been produced from compounds containing amine compounds may also be used, but are less preferred. Suitable compounds containing amine groups which may be used as starting materials for the production of polyethers include: ammonia; methyl amine; tetramethylene diamine; ethanolamine; diethanolamine; triethanolamine; ethylene diamine; diethylene triamine; triethylene tetraamine; 1,6-hexane diamine; piperazine; 2,5-dimethyl piperazine; 1-amino-3-aminomethyl-3,3,5-trimethyl cyclohexane; bis-(4-aminocyclo-hexyl)-methane; bis-(4-amino-3-methylcyclohexyl)-methane; 1,4-cyclohexane diamine; 1,2-propane diamine; hydrazine; aminoacid hydrazides; hydrazides of semicarbazido carboxylic acids; bis-hydrazides; bis-semicarbazides; aniline; phenylene diamine; 2,4- and 2,6-toluylene diamine; polyphenylene polymethylene polyamines of the type obtained by the aniline/formaldehyde condensation reaction and mixtures thereof. Resinous materials such as phenol and cresol resins may also be used as starting materials.

Polyethers modified by vinyl polymers are also suitable for producing the isocyanate group terminated prepolymers useful in the practice of the present invention. These polyethers may be obtained by polymerizing styrene and acrylonitrile in the presence of a polyether (U.S. Pat. Nos. 3,383,351; 3,304,273; 3,523,095; 3,110,695 and German Patent 1,152,536). Amino polyethers in which at least a portion of the hydroxyl groups of a polyether are converted to amino groups.

The preferred starting compounds for the polyethers are those compounds which exclusively contain hydroxyl groups, while compounds containing tertiary amine groups are less preferred and compounds containing isocyanate-reactive-NH groups are much less preferred.

Among the polythioethers which are useful in producing isocyanate-terminated prepolymers, are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides.

Suitable polyacetals include the compounds prepared from aldehydes (e.g., formaldehyde) and glycols such as diethylene glycol, triethylene glycol, ethoxylated 4,4'-dihydroxy-diphenyldimethylmethane, and hexanediol-(1,6). Polyacetals suitable for the practice of the present invention may also be prepared by the polymerization of cyclic acetals.

Polyhydroxy polyester amides and polyamines which are the predominantly linear condensates obtained from polybasic saturated and unsaturated carboxylic acids or their anhydrides and polyvalent saturated or unsaturated aminoalcohols, diamines, polyamines and mixtures thereof are also suitable for the production of isocyanate terminated prepolymers to be used in the practice of the present invention.

Monomers useful for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

In addition to high molecular weight isocyanate reactive compounds, the isocyanate-terminated prepolymers may also optionally be prepared with low molecular weight isocyanate-reactive compounds having an average molecular weight of up to 400. The low molecular weight isocyanate-reactive compounds should have an average functionality of from about 2 to about 8, preferably from about 2 to about 6 and most preferably from about 2 to about 4. These low molecular weight compounds may also contain ether, thioether, ester, urethane and/or urea bonds.

Examples of low molecular weight compounds include the polyamines and diols or triols used as chain lengthening agents or cross-linking agents in polyurethane chemistry. Examples of such compounds are those listed as suitable for preparing the polyisocyanate adducts containing urethane or urea groups and the polyester and polyether polyols. Additional examples include those listed in U.S. Pat. Nos. 4,439,593 and 4,518,522.

A solvent or solvent mixture may be used during the production of the polyisocyanate adducts or isocyanate-terminated prepolymers but a solvent is not necessary. When a solvent is employed (e.g., to promote thorough mixing of the compounds used for preparing the isocyanate-terminated prepolymer), the solvent or solvent mixture is subsequently distilled off (preferably under vacuum) to recover a ready-to-use, liquid polyisocyanate component in solvent-free form.

Suitable solvents include any of the known polyurethane solvents. Examples of such solvents are: toluene; xylene; butyl acetate; ethylacetate; ethylene glycol monoethyl ether acetate (EGA); ethylene glycol monomethyl ether acetate; ethylene glycol monobutyl ether acetate; diethylene glycol monomethyl ether acetate; diethylene glycol monobutyl ether acetate; propylene glycol monomethyl ether acetate; methyl ethyl ketone or methyl isobutyl ketone; hydrocarbon solvents such as hexane and heptane; aromatic solvents and also mixtures of the above solvents.

Prior to their use in accordance with the present invention, the isocyanate groups of the polyisocyanate component are blocked with a phenolic blocking agent or an oxime. Examples of suitable phenolic blocking agents include phenol; or alkylated phenols such as nonylphenol; the cresols; the trimethyl phenols and the tert.-butyl phenols. The reaction between the isocyanate groups and the blocking agent is conducted at a temperature of from about 50° to about 120° C., preferably from about 70° to about 100° C. The reaction may be conducted in the presence of a solvent although the presence of a solvent is not necessary. Suitable solvents include those listed above as being useful for preparing the polyisocyanate adducts or isocyanate-terminated prepolymers.

The oxime-blocking agents for the free isocyanate groups contain an active hydrogen atom which reacts with the isocyanate groups at room temperature in an equilibrium reaction which can be represented as

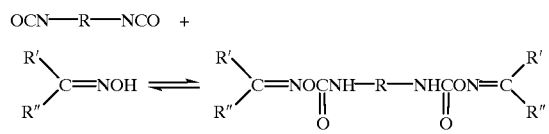

where

R represents a polyurethane chain and

R' and R" taken alone are hydrogen, aliphatic or aromatic groups, or taken together with the carbon atoms to which they are attached, are part of 5- or 6-membered aliphatic or aromatic ring.

At moderately elevated temperatures the reaction proceeds from right to left generating free isocyanate groups which react with the blocking agent present in the system.

Oximes useful as blocking agents include acetophenone oxime,

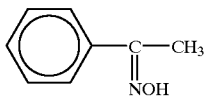

acetone oxime,

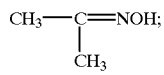

methyl ethyl ketoxime,

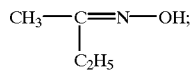

and cydohexanone oxime,

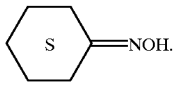

Other oximes which can be used as blocking agents are propyl aldehyde oxime, formaldoxime, butyl aldehyde oxime, cyclopentanone oxime, benzophenone oxime, methyl amyl ketoxime and methyl isobutyl ketone oxime.

The polyketimines, polyenamines and oxazolidines useful in the compositions of the present invention are known materials.

The oxazolidine components in the mixture according to the invention may be any organic compounds having at least one, preferably two or three, groups corresponding to the formula

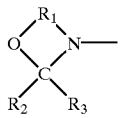

in which $R_1$ represents an aliphatic hydrocarbon group having from 2 to 6, preferably 2 or 3, carbon atoms and $R_2$ and $R_3$ may be the same or different and represent hydrogen, aliphatic hydrocarbon groups having from 1 to 4 carbon atoms, cycloaliphatic hydrocarbon groups having from 5 to 7 carbon atoms or aromatic hydrocarbon groups having from 6 to 10 carbon atoms or, together with the ring carbon atom, they may represent a five-membered or six-membered cycloaliphatic hydrocarbon ring.

$R_2$ and $R_3$ are preferably the same or different groups and represent hydrogen or an aliphatic hydrocarbon group having from 1 to 4 carbon atoms.

Such oxazolidines have been described, for example, in U.S. Pat. Nos. 3,661,923; 3,864,335; 3,743,626 and 4,002,601 and in German Offenlegungsschrift No. 2,446,438.

Preferred oxazolidines for use in the practice of the present invention are those represented by the formula

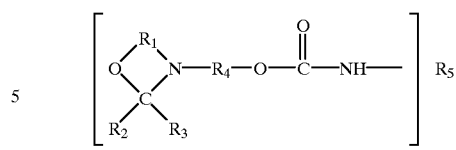

in which $R_1$, $R_2$ and $R_3$ have the meanings specified above, $R_4$ represents an aliphatic hydrocarbon group having from 2 to 6, preferably 2 or 3 carbon atoms, and $R_5$ represents a group which can be obtained by removal of the isocyanate groups from an organic isocyanate having a valency of n, preferably a di- or tri-isocyanate and n represents an integer of from 1 to 6, preferably 2 or 3 and most preferably 2.

The preparation of these preferred oxazolidines has been described in German Offenlegungsschrift No. 2,446,438 and U.S. Pat. No. 4,002,601. Typical examples of oxazolidines which are useful in the practice of the present invention are: N-(isopropyl-1,3-oxazolidine-3-yl)-ethoxycarbonyl benzylamine; N-(2-isopropyl-1,3-oxazolidin-3-yl)-ethoxycarbonyl-stearylamine; N,N-bis-[(2-isopropyl-1,3-oxazolidin-3-yl)-ethoxycarbonyl]-1,6-diaminohexane; N,N'-bis[(1,3-oxazolidin-3-yl)-ethoxycarbonyl]-1,6-diamino-hexane; N,N'-bis[(2-isopropyl-5-methyl-oxazolidin-3-yl)-iso-propoxycarbonyl]-1,6 diaminohexane; N,N'-bis(2-isopropyl-oxazolidin-3-yl)-ethoxycarbonyl[-toluylene-2,4-diamine, N,N'-bis-[(2-isopropyl-5-methyl-1,3-oxazolidin-3-yl)-iso-propoxy carbonyl]-1-aminomethyl-5-amino-1,3,3-trimethyl-cyclohexane.

Hydrolytic ring opening of these oxazolidines results in the formation of one hydroxyl and one secondary amino group per oxazolidine ring so that even oxazolidines having only one oxazolidine ring are converted by reaction with water into compounds which are difunctional for the purpose of the isocyanate addition reaction. It is particularly preferred to use urethane oxazolidines corresponding to the above formula which contain two oxazolidine rings, such as N,N'-bis-[(2-isopropyl-1,3-oxazolidin-3-yl)-ethoxycarbonyl]-1,6-diamino hexane.

Any of the known polyenamines (as used herein, polyenamines includes dienamines) compounds described, for example, in German publication 21 26 822 (corresponding to U.S. Pat. No. 3,865,791) can be used in the practice of the present invention. Polyenamines are the reaction products of secondary amines with selected aldehydes and ketones. The general formula for polyenamines is given at column 1, lines 33 through column 2, line 17 of U.S. Pat. No. 3,865,791.

Di- or polyamines containing primary amino groups which may be used in the preparation of ketimines useful in the practice of the present invention include, in particular, those which contain saturated or unsaturated, linear or branched aliphatic hydrocarbon radicals with two to 36 carbon atoms, cycloaliphatic hydrocarbon radicals with preferably six carbon atoms in the ring, araliphatic hydrocarbon radicals with benzyl, xylylene, diphenylmethane and tolyl groups, and aromatic hydrocarbon radicals which preferably contain benzene rings. Specific examples of suitable amines include: 4,4'-diamino-diphenylmethane; toluene 2,4-diamine and toluene 2,6-diamine and mixtures of these isomers; xylylene-1,3-diamine; 1-methyl-2,4-diaminocyclohexane; isophorone diamine; 2,4,4-trimethyl-1,6-diaminohexane; 2,2,4-trimethyl-1,6-diaminohexane;

2,5-dimethyl-piperazine; and any of the commercially available polyamines which contain primary amino groups.

Ketones which contain two identical or two different linear and/or branched aliphatic hydrocarbon radicals with from 1 to 18 carbon atoms or one hydrocarbon radical in the form of a ring, or aromatic hydrocarbon radicals, especially phenyl radicals are particularly suitable for the production of ketoximes useful in the practice of the present invention. Specific examples of suitable ketones include: methyl ethyl ketone, diethyl ketone, methylisobutyl ketone, diisobutyl ketone, cyclohexanones and acetophenones.

Preferred polyketimines useful in the practice of the present invention are those formed from diamines based on primary amino groups which are attached to secondary atoms. Specific examples of these preferred polyketimines include: the bis-ketimine of isophorone diamine and butanone and the bis-ketimine of bis(para-aminocyclohexyl) methane and butanone.

Water-generating compounds of the type required in the present invention are known. Any compound which releases or forms water when the temperature of the one-component system of the present invention is raised above 50° C., preferably above 70° C., is a water-generating compound within the scope of the present invention. Examples of such compounds include internal salts, salts of organic amines and acid salts. Hydrates which do not release the water of hydration could also be used.

Suitable internal salts for use as water generating compounds useful in the practice of the present invention include those which contain at least two primary or secondary amino groups and at least one organic acid group, preferably a sulfonic or carboxylic acid group and more preferably a carboxylic acid group. The polyamine internal salts generally have a molecular weight of from about 100 to about 1,000, preferably from about 100 to about 400, and have an average functionality of from about 2 to about 8, preferably from about 2 to about 4. Preferred polyamines are amino carboxylic acids.

Examples of suitable amino acids useful for producing amino carboxylic acid internal salts include lysine, β-hydroxylysine, arginine, cystine, tryptophan and histidine. Also suitable are the reaction products of polycarboxylic (preferably dicarboxylic acids), their anhydrides or alkyl esters (such as those previously disclosed for preparing the polyester polyols) with polyamines having a molecular weight (Mn, as determined by end group analysis) of from about 103 to about 10,000, preferably from about 103 to about 6000 and most preferably from about 103 to about 400, and an average functionality of from about 3 to about 8, preferably from about 3 to about 4. Examples of suitable high molecular weight polyamines are the amino-terminated polyethers described above as being suitable for preparing the isocyanate-terminated prepolymers. Examples of low molecular weight polyamines include diethylene triamine, triethylene tetramine and polyphenylene polymethylene polyamines of the type obtained by the aniline/formaldehyde condensation reaction and mixtures thereof.

An especially preferred internal salt is the reaction product of phthalic acid anhydride and diethylene triamine which is represented by the formula

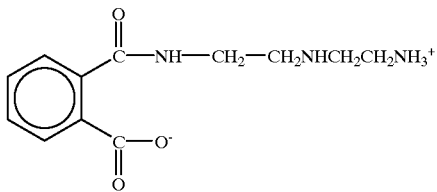

If a solid polyamine internal salt is used as the water-generating compound in the one-component compositions of the present invention, the solid polyamine internal salt is dispersed in the liquid, phenolic blocked polyisocyanate. The amount of amine internal salt is selected to provide an equivalent ratio of isocyanate groups to amine groups of from about 4:1 to 0.5:1.0, preferably from about 1.8:1.0 to about 0.8:1.0. The amino group of the solid polyamine internal salt which is in salt form is considered to be an amino group.

Suitable polyamine salts for use in accordance with the present invention are those which remain stable in the presence of the polyisocyanate component for at least one month, preferably for at least two months, when stored at ambient temperature. The polyamine salts may be prepared by reacting a solid or liquid polyamine with organic or inorganic acids in order to form a solid product.

Suitable polyamines for preparing the solid polyamine salts have a molecular weight (Mn, as determined by end group analysis) of from about 60 to about 10,000, preferably from about 60 to about 6000 and most preferably from about 60 to about 400, and have an average functionality of from about 2 to about 8, preferably from about 2 to about 4. Suitable high molecular weight amines include the amino-terminated polyethers described above as being suitable for preparing the isocyanate-terminated prepolymers. Examples of such low molecular weight polyamines include: ethylene diamine; propylene diamine; butylene diamine; diethylene triamine; triethylene tetramine; 1,6-hexane diamine; piperazine; 2,5-dimethyl piperazine; 1-amino-3-amino-methyl-3, 3,5-trimethyl cyclohexane; bis-(4-aminocyclohexyl)-methane; bis-(4-amino-3-methylcyclohexyl)-methane; 1,4-cyclohexane diamine; 2,4-and/or 2,6-toluylene diamine; 4,4'-and/or 2,4-diaminodiphenyl methane; polyphenylene polymethylene polyamines of the type obtained by the aniline/formaldehyde condensation reaction and mixtures thereof.

Suitable organic or inorganic acids for reaction with the polyamines to form the polyamine salts include mineral acids, carbon dioxide and carboxylic acids and their anhydrides. Preferred acids are the organic alkyl carboxylic acids containing from about 1 to about 20, preferably from about 2 to 8 carbon atoms. Volatile organic acids such as acetic acid are especially preferred. The polyamines and acids are reacted in amounts sufficient to provide a ratio of amino groups to acid groups of from about 1.0:0.01 to about 1.0:1.0, preferably from about 1.0:0.07 to about 1.0:0.5.

In the compositions of the present invention, the blocked polyisocyanate a), the material selected from polyketimines, polyenamines and oxazolidines b), and the water-generating compound c) are used in amounts such that the equivalent ratio of a:b:c is from about 1.0:0.1:0.3 to about 1.0:2.0:2.0, preferably from about 1.0:0.3:0.5 to about 1.0:1.5:1.5.

In accordance with the present invention it is possible to replace up to 75% by weight, preferably up to 50% by weight of the liquid blocked polyisocyanate with an epoxy resin in order to improve the hardness or adhesion to substrates of the resulting polyurethane or polyurea.

Generally, in order to obtain improved hardness or adhesion, it is necessary to replace at least 5% by weight, preferably at least 10% by weight of the liquid blocked polyisocyanate. In determining the amount of solid polyamine internal salt to be dispersed into the mixture of liquid blocked polyisocyanate and epoxy resin, an epoxide group is considered to be the same as one isocyanate group such that the ratio of isocyanate and epoxide groups to amino groups should conform to the above ratios.

Suitable epoxy resins have an average molecular weight ($M_n$ as determined by end groups analysis) of from about 500 to about 20,000, preferably from about 500 to about 5000. The epoxy resins may be prepared from a dihydric phenol and a diglycidyl ether of a dihydric phenol. Both the dihydric phenol and the diglycidyl ether of a dihydric phenol may also contain other substituents such as alkyl, aryl, sulfido, sulfonyl, halo etc.

Examples of suitable phenols include 2,2-bis(4-hydroxyphenyl)-propane; 2,2-bis(3-bromo-4-hydroxyphenyl)propane; 2,2,-bis(3-chloro-4-hydroxyphenyl)-propane; bis(4-hydroxyphenyl)-methane; bis(4-hydroxyphenyl)-sulfone; bis(4-hydroxyphenyl) sulfide; resorcinol; hydroquinone, and the like. The preferred dihydric phenols are 2,2-bis(4-hydroxy-phenyl)-propane (bisphenol A) and bis(4-hydroxyphenyl)methane for reasons of cost and availability.

The diglycidyl ether derivatives may be prepared by reacting a dihydric phenol with a halogen-containing epoxide or dihalohydrin in the presence of an alkaline medium. By varying the ratios of the dihydric phenol and epichlorohydrin reactants, different molecular weight products can be obtained. (See, e.g., U.S. Pat. Nos. 2,582,985; 2,615,007 and 2,633,458.

Optionally, a portion of the diglycidyl ether of a dihydric phenol component may be repeated with a diglycidyl ether of a hydrogenated dihydric phenol derivative. For example, the diglycidyl ether of dihydric phenol may have up to approximately 100 percent of its weight substituted by a diglycidyl ether such as 2,2-bis(4-hydroxycyclohexyl)-propane or bis(4-hydroxy-cyclohexyl) methane.

The compositions of the present invention may be cured at elevated temperatures, i.e., at temperatures above that at which water is removed or formed by the water-generating compound. Temperatures which are sufficient to unblock the polyisocyanate may also be used when an extremely rapid cure of the composition is desired. Generally, the compositions are cured at temperatures of from about 70° to 200° C., preferably from about 100 to about 140° C.

The one-component compositions of the present invention can be cured to form high quality elastomers, coatings, sealants, cellular elastomers and moldings optionally having a density distribution characterized by a cellular inner core and a more compact outer skin.

Other materials which may optionally be used in the compositions of the present invention include fillers and additives such as plasticizers, catalysts, leveling agents, pigments, dyes, ultraviolet stabilizers, antioxidants, stabilizers, flow control agents, and the like which are known in the art.

The invention is further illustrated but is not intended to be limited by the following examples in which all parts and percentages are by weight unless otherwise specified.

EXAMPLES

The materials used in the Examples below were as follows:

POLYISOCYANATE A: A blocked isocyanate terminated prepolymer which was prepared by charging 64.8 parts of TDI (an 80/20 weight percent mixture of the 2,4-isomer and 2,6-isomer of toluylene diisocyanate) were charged to a 1000 ml three-necked flask equipped with a mechanical stirrer and a thermometer. The contents of the flask which was maintained at 70° C. were stirred while 468.0 parts of polyether polyol were added. The polyether polyol had secondary hydroxyl groups, an OH number of 42, and a functionality of 2.6. This polyether polyol had been prepared by alkoxylating a mixture of 74 weight percent glycerine and 24 weight percent propylene glycol with a mixture of 85 weight percent propylene oxide and 15 weight percent ethylene oxide. Upon completion of the addition, the temperature of the reaction mixture increased slightly due to the exothermic reaction. The contents of the flask were maintained at 70° C. for approximately 2 hours (until the theoretical isocyanate content was obtained). Thereafter, 105.6 parts of nonyl phenol and 0.08 parts of stannous octoate were added, the temperature was decreased to 50° C. and the reaction mixture was maintained at this temperature for approximately 3 hours (until there was no detectable isocyanate content). The blocked prepolymer was then poured from the reaction flask into a storage container, purged with nitrogen, sealed and allowed to cool to ambient temperature.

POLYISOCYANATE B: A blocked isocyanate prepared by reacting 89 grams (0.95 moles) of phenol with 209 grams (0.93 moles) of a 90% solids solution of the isocyanurate of hexamethylene diisocyanate (HDI) in butyl acetate and Aromatic 100 at 80° C. until there was no detectable isocyanate content.

KETIMINE A: A liquid bis-ketimine of isophorone diamine and butanone was prepared by boiling a mixture of 3,3,5-trimethyl-5-aminomethylcyclohexylamine (IPDA) and methyl ethyl ketone (butanone) present in a relative weight ratio 170 grams to 216 grams. The mixture was boiled until 36 grams of water were removed using a Dean-Stark apparatus. Excess butanone was then removed by distillation.

KETIMINE B: A bis-ketimine of hexamethylene diamine and methyl isobutyl ketone was prepared by boiling a mixture of 116 grams of hexamethylene diamine (HDA) and 300 grams of methyl isobutyl ketone (MIBK) until 36 grams of water were removed using a Dean-Stark apparatus. Excess MIBK was then removed by distillation.

Example 1

Solvent-free mixtures of POLYISOCYANATE A, KETIMINE A and the condensation product of one mole phthalic anhydride and one mole of diethylene triamine were prepared at a variety of different equivalent ratios. Optimum cure and storage stability were evaluated. The ratios and the properties of these mixtures are reported below in Table 1.

All samples described in Table 1 were stable at room temperature for greater than 3 months when stored in the absence of water. Mixtures which did not cure at 150° C. within 20 minutes generally did not cure at higher cure temperatures and/or longer cure times.

MIXTURE A yielded clear, bubble-free polymers when cured at 150° C. for 20 minutes. The cured polymers, which were 0.25 inch thick and 1 inch in diameter exhibited a Shore A hardness value of 35.

TABLE 1

| MIXTURE EQUIVALENT RATIO | | CURE[a] | |
|---|---|---|---|
| | A:B:C[b] | 150° C./120 min. | SHORE A[c] |
| A | 3:1:2 | + | 35 |
| B | 2:1.5:1.5 | + | 35 |
| C | 2:1:1 | + | 35 |
| -D | 2:0:1 | NO | — |
| -E | 1:0:1 | T | — |
| F | 1:1:0 | NO | — |
| G | 1:2:0 | NO | — |
| H | 2:1:0 | NO | — |
| -I | 2:0:1.5 | NO | — |
| -J | 1:0:1.2 | (+) | 35 |
| K | 1:0:0 | NO | — |

[a]Legend: + = good cure; T = tacky; (+) = cured at 170° C./45 minutes.
[b]A = POLYISOCYANATE A; B = KETIMINE A: C = condensation product of one mole each of phthalic anhydride and diethylene triamine.
[c]Determined by ASTM D2240.

Example 2 (COMPARATIVE)

POLYISOCYANATE A and KETIMINE B were combined in a 1:1 equivalent ratio. This mixture cured at 100° C. within 15 minutes. The potlife of this mixture was approximately 3 hours at ambient temperature in a closed container under nitrogen.

Example 3

140 grams (0.08 equivalents) of POLYISOCYANATE A, 15.0 grams (0.08 equivalents) of the epoxy functional resin which is commercially available from Shell under the name Epon 828, 11.2 grams (0.08 equivalents) of KETIMINE A, and 10.0 grams (0.08 equivalents) of the condensation product of phthalic acid anhydride and diethylene triamine (1:1 equivalent ratio) were combined. This composition produced a polyurethane having a Shore A Hardness value of 45.

Example 4 (COMPARATIVE)

Diethylene triamine (unblocked) and POLYISOCYANATE A were combined at a 1:1 equivalent ratio. This composition gelled within 45 minutes at room temperature.

Example 5 (COMPARATIVE)

Diethylene triamine (unblocked) and POLYISOCYANATE B were combined at a 1:1 equivalent ratio. This mixture gelled at room temperature within 4 days.

Example 6 (COMPARATIVE)

15.6 grams (0.4560 equivalents) of diethylene triamine (unblocked) and a methyl ethyl ketone-blocked isocyanurate of hexane diisocyanate (0.4054 equivalents) were combined at a 1:1 equivalent ratio. The viscosity of this composition increased by a factor of 2 within 2 weeks at room temperature and by a factor of 15 within 2 weeks at 60° C.

Example 7 (COMPARATIVE)

A mixture of 153.7 grams (0.0878 equivalents) of POLYISOCYANATE A, 12.2 grams (0.0878 equivalents) of KETIMINE A and 18.8 grams (0.5823 equivalents) of sodium sulfate decahydrate was not stable at ambient temperature.

A second mixture which differed from that described above only in that 6.5 grams (0.2018 equivalents) of sodium sulfate decahydrate were included was also not stable at room temperature and gelled within 24 hours.

Two other samples in which the amount of sodium sulfate decahydrate was varied were prepared. In one, 3.8 grams (0.1180 equivalents) were included and in the second, 1.9 grams (0.0590 equivalents) of sodium sulfate decahydrate were included. The first of these mixtures was not stable at ambient temperature and the second did not cure at 90° C. after 45 minutes.

It was found that mixtures containing from 1 to 10 equivalents of water per equivalent of ketimine gelled within 24 hours at ambient temperature. Mixtures containing less than 1 equivalent of water per equivalent of ketimine did not cure properly.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A storage stable, one-component polyurethane composition useful as a sealant or coating which cures at elevated temperature comprising
   a) an isocyanate selected from
      (1) isocyanate terminated prepolymers formed from a polyisocyanate and a hydroxyl group containing compound having at least two hydroxyl groups and a molecular weight greater than 500 which prepolymers have been blocked with a phenol or oxime,
      (2) polyisocyanate adducts in which the free isocyanate groups have been blocked with a phenol or oxime, and
      (3) monomeric isocyanates which have been blocked with a phenol or oxime;
   b) at least one compound selected from the group consisting of polyketimines having amino groups attached to secondary carbon atoms, polyenamines and oxazolidines; and
   c) a compound which generates water under the curing conditions in which components a), b) and c) are used in amounts such that the equivalent ratio of a):b):c) is from about 1:0.1:0.3 to about 1:2:2.

2. The composition of claim 1 in which the water-generating compound c) is selected from the group consisting of internal organic salts, salts of organic amines and salts of organic acids.

3. The composition of claim 1 in which the blocked isocyanate a) is a phenol-blocked aromatic isocyanate prepolymer.

4. The composition of claim 3 in which the phenol blocking agent is nonylphenol.

5. The composition of claim 3 in which a polyketimine is used as component b).

6. The composition of claim 5 in which the water-generating compound c) is a condensation product of phthalic acid anhydride and diethylene triamine.

7. The composition of claim 3 in which the water-generating compound c) is a condensation product of phthalic acid anhydride and diethylene triamine.

8. The composition of claim 1 in which the blocked isocyanate a) is a phenol-blocked toluene diisocyanate prepolymer.

9. The composition of claim 8 in which the phenol blocking agent is nonylphenol.

10. The composition of claim 9 in which a polyketimine is used as component b).

11. The composition of claim 10 in which the water-generating compound c) is a condensation product of phthalic acid anhydride and diethylene triamine.

12. The composition of claim 1 in which a polyketimine is used as component b).

13. The composition of claim 12 in which the polyketimine is the bis-ketimine of isophorone diamine and butanone.

14. The composition of claim 12 in which the polyketimine is the bis-ketimine of bis(4-aminocyclohexyl) methane and butanone.

15. The composition of claim 1 in which the water-generating compound c) is the condensation product of phthalic anhydride and diethylene triamine formed at a molar ratio of 1:1.

16. The composition of claim 1 in which components a), b) and c) are used in amounts such that the equivalent ratio of a):b):c) is from about 1:0.3:0.5 to about 1:1.5:1.5.

* * * * *